Sept. 19, 1939. O. RISZDORFER Re. 21,210

APPARATUS FOR AUTOMATICALLY DETERMINING THE EXPOSURE IN PHOTOGRAPHIC APPARATUS

Original Filed Jan. 28, 1931 3 Sheets-Sheet 1

Inventor:
O. Riszdorfer

By: Marks & Clerk
Attys.

Inventor:
O. Riszdorfer
By: Marks & Clerk
Attys.

Sept. 19, 1939. O. RISZDORFER Re. 21,210

APPARATUS FOR AUTOMATICALLY DETERMINING THE EXPOSURE IN PHOTOGRAPHIC APPARATUS

Original Filed Jan. 28, 1931 3 Sheets-Sheet 3

INVENTOR.
O. Riszdorfer
By Glascock, Downing & Seebold
ATTORNEYS.

Reissued Sept. 19, 1939

Re. 21,210

UNITED STATES PATENT OFFICE 21,210

APPARATUS FOR AUTOMATICALLY DETERMINING THE EXPOSURE IN PHOTOGRAPHIC APPARATUS

Ödön Riszdorfer, Budapest, Hungary

Original No. 2,000,037, dated May 7, 1935, Serial No. 511,832, January 28, 1931. Application for reissue September 25, 1936, Serial No. 102,612

15 Claims. (Cl. 88—23)

This invention relates to apparatus for determining the correct exposure in photographic cameras and like apparatus.

The invention has for its object to enable the correct exposure to be determined at all times in a simple manner without involving errors of observation such as may occur in the case of optical exposure meters.

The quantity of light which impinges on the light-sensitive emulsion during a photographic exposure is determined by the size of the diaphragm opening of the photographic objective and by the time during which the objective is uncovered, that is to say, by the speed of the shutter. The diaphragm opening is usually adjustable and the shutter adjustable for obtaining different speeds. Owing to this, there is some difficulty in the case of any particular exposure of choosing a diaphragm stop and shutter speed such that correct exposure of the light-sensitive layer takes place.

This difficulty is overcome by means of the present invention which consists in the provision on the camera of a photo-electric cell fitted with an adjustable diaphragm, the said cell being included in an electric circuit containing a movable indicating member actuatable by the cell current, said indicating member co-operating with a second indicating member, manually actuatable means being provided for varying the position of one of the indicating members adjusting means of which is positively interconnected relatively to the other for enabling the indicating members to be brought into coincidence, said manually actuatable means being positively connected to one of the adjustable exposure controlling devices, viz., diaphragm or shutter, which control the passage of light through the objective, so that when the indicating members are adjusted to bring them into coincidence the said exposure controlling device is adjusted in accordance with the displacement of the indicating member actuated by the cell current.

Adjustment of the diaphragm of the photo-electric cell varies the quantity of light passing to the photo-electric cell and consequently the current which flows through the electric circuit so that the position of the indicating member which is actuatable by the cell current will be altered every time the diaphragm of the photo-electric cell is adjusted.

In cases where only the exposure controlling device connected to the means for establishing coincidence is adjustable, while the other exposure controlling device is non-adjustable (single speed shutter or single stop diaphragm), the diaphragm of the photo-electric cell need only be varied when a faster or slower sensitive layer is employed. On the other hand when both the shutter and the diaphragm are adjustable, then the arrangement must be such that the diaphragm of the photo-electric cell will be adjusted in accordance with the setting of the exposure controlling device not connected to the means for establishing coincidence, the said device and the diaphragm of the photo-electric cell being preferably positively interconnected.

The accompanying drawings show several constructional forms of the invention by way of example.

Figure 1:
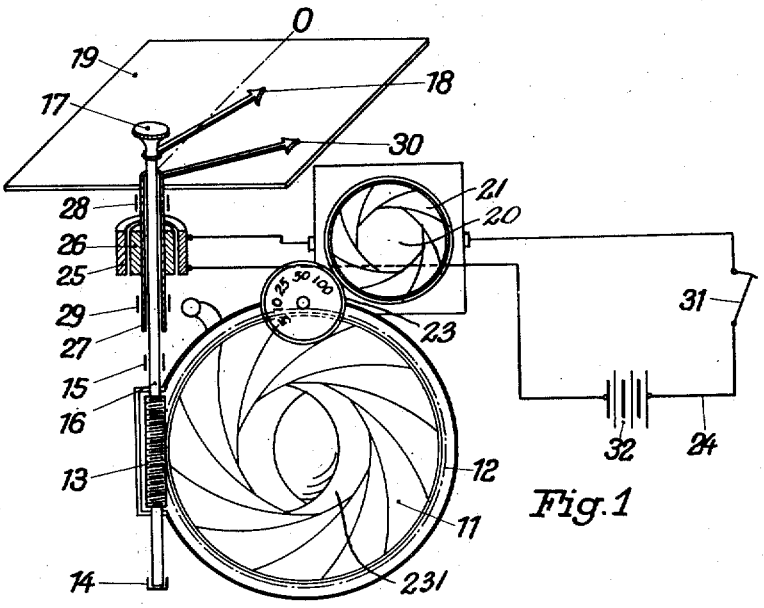
Fig. 1 shows a view of an arrangement according to the invention.

In the arrangement shown in Fig. 1, the iris diaphragm of the objective of a photographic apparatus is indicated by 11. The mounting 12 of the diaphragm is constructed as a worm wheel into the teeth of which the worm 13 engages. The worm 13 is mounted in bearings 14 and 15 and the upper end of the shaft 16 of the worm is provided with knob 17 adapted to be actuated by hand. On the shaft 16 there is attached in addition an indicator 18 which lies above or below the finder glass 19 and the position of which at a given instant corresponds to the degree of rotation of the shaft 16 and therefore to the size of the aperture of the diaphragm 11. 20 is a photoelectric cell which may likewise be provided with a diaphragm 21. The mount 22 of the diaphragm is constructed as a toothed wheel and engages with the disc 23 which is likewise constructed as a toothed wheel and which is the disc usually provided in photographic apparatus for adjusting the speed of the shutter 231 of the objective. A coil 25 is situated in the circuit 24 of the photo-cell, within which coil a soft iron core 26 is capable of rotating, as in the case of measuring instruments. The soft iron core 26 has a hollow shaft 27 which is mounted at 28 and 29 and which carries an indicator 30. The indicator 30 also moves above or below the finder glass or the matt plate 19 coaxially with the indicator 18 since the shaft 16 of the indicator 18 passes through the hollow shaft 27.

Before photographing, the circuit 24 of the cell current is closed by means of a switch 31, whereupon the battery 32 yields current. The shutter is then adjusted to the desired speed by rotating the disc 23. The connection between the disc 23 and the diaphragm 21 of the cell is such that the greater the speed chosen the more the aperture of the diaphragm 21 is diminished. A current of strength corresponding to the illumination of the photo-cell 20 is set up in the circuit 24 and the indicator 30 is deflected from the zero (0) position. The knob 17 is now rotated until the indicator 18 coincides with the indicator 30. Since the diaphragm 11 also is adjusted by rotation of the knob 17 the diaphragm opening 11 is smaller the larger the deflection of the indicator 30 and, conversely, the diaphragm opening 11 is greater the smaller the deflection of the indicator 30. The diaphragm, therefore, is each time adjusted corresponding to the strength of the illumination, the shutter speed chosen each time being taken into consideration by the adjustment of the diaphragm 21 by means of disc 23.

The plate sensitivity, so far as it deviates from the normal, may likewise be taken into account by arranging the diaphragm 21 of the photocell so as to be adjustable also by hand and, after adjusting the speed of the shutter, correcting the diaphragm aperture by hand in addition.

Figure 2:
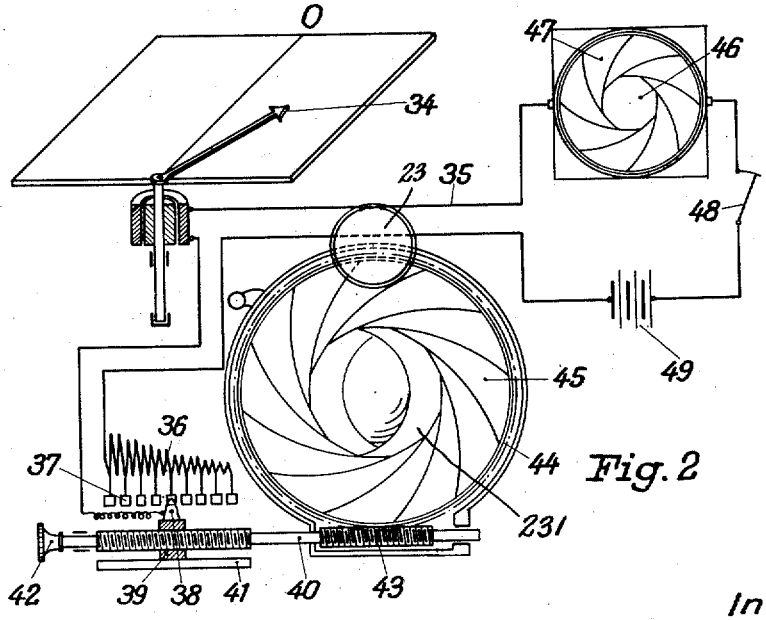
Fig. 2 shows a view of a modification of the arrangement shown in Fig. 1.

Instead of having two movable indicating members 18 and 30 the same problem may also be solved with one movable and one stationary indicating member. Such a construction is shown in Fig. 2. In this construction the indicator 34 is likewise moved by the cell current as already described for Fig. 1. The second indicating member is a line 0 on the matt plate or in the finder. In the cell circuit 35 there is a variable resistance 36, over the contacts 37 of which the sliding contact 38 moves. The latter is carried by the travelling nut 39 which travels along the guide 41 when the spindle 40 is rotated. The spindle 40, capable of being rotated by the hand wheel or knob 42, continues into the worm 43 which adjusts the objective diaphragm 45 by way of the screw wheel 44, just as already described in the case of Fig. 1. The photocell 46, with the diaphragm 47, the switch 48, and the battery 49 are similarly arranged as in Fig. 1.

If switch 48 is closed the indicator 34 deflects, as shown, the deflection being proportional to the current strength in the circuit 35. The small wheel 42 is now rotated until the contact inserts as much resistance into the current circuit 35 as suffices to bring the indicator 34 back to the zero position. At the same time the objective diaphragm 45 is diminished by way of the worm 43, the diminution being the greater the greater is the deflection of the indicator 34, and therefore the greater the current in the circuit 35. In this constructional form, therefore, there is also the same proportionality between the exposure of the photocell and the adjustment of the objective diaphragm as in the arrangement shown in Fig. 1.

Since the exposure of the plate decreases with the adjustment of the diaphragm in inverse proportion to the square of the diaphragm opening, the resistance 36 is preferably constructed in such a way, or the individual resistance stays are constructed in such a way, that the resistance of the successive stages are in quadratic ratio to one another. In this way linear proportionality between the cell current and the movements of the adjusting mechanism 40, 43 is secured.

The arrangement described can, of course, also be constructed such that the shutter operating mechanism is influenced by the adjusting mechanism, instead of the objective diaphragm.

Figure 4:
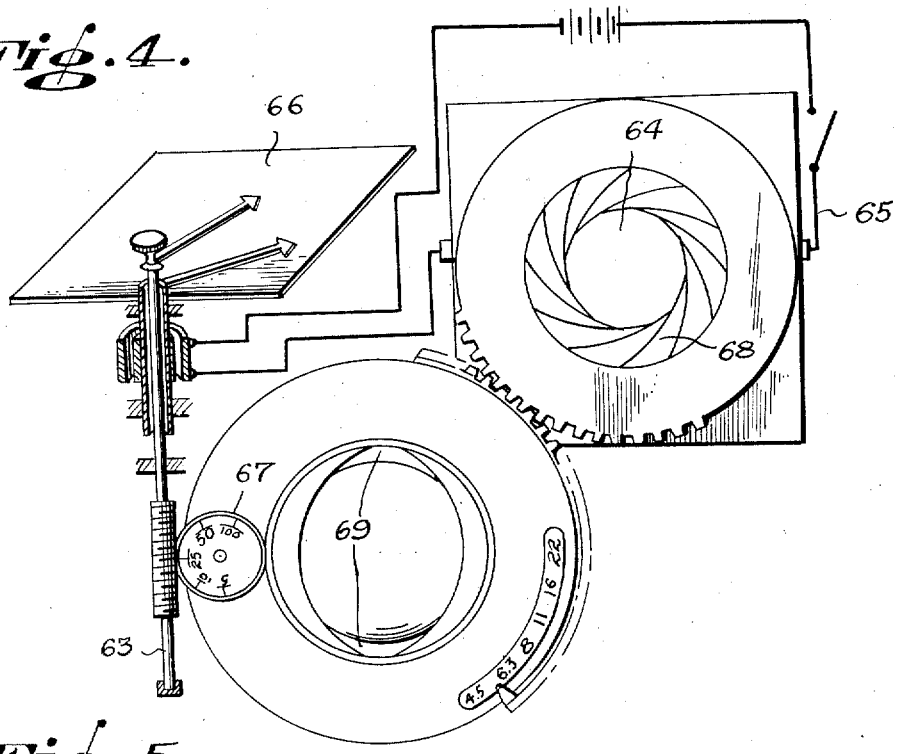
Fig. 4 shows an arrangement corresponding to Fig. 1, the shutter operating mechanism being adjusted, however, instead of the diaphragm.

A constructional form is shown in Fig. 4 which corresponds substantially to the arrangement of Fig. 1. The photocell 64 with the cell circuit 65 and the adjusting mechanism 66 are constructed in exactly the same manner as the corresponding members in Fig. 1. The spindle 63 engages the disc 67 which is geared to the shutter and adjusts the shutter speed. The diaphragm 68 of the photocell and the diaphragm 69 of the camera objective are positively connected together by gear teeth in a similar manner to the adjusting disc 23 of the shutter shown in Fig. 1. The apparatus operates in the same way as that of Fig. 1 in that first of all by rotating the diaphragm 69 of the apparatus the diaphragm of the photocell is adjusted, after which as described in Fig. 1 the pointers are brought into coincidence and thereby the corresponding shutter speed is adjusted.

Figure 3:
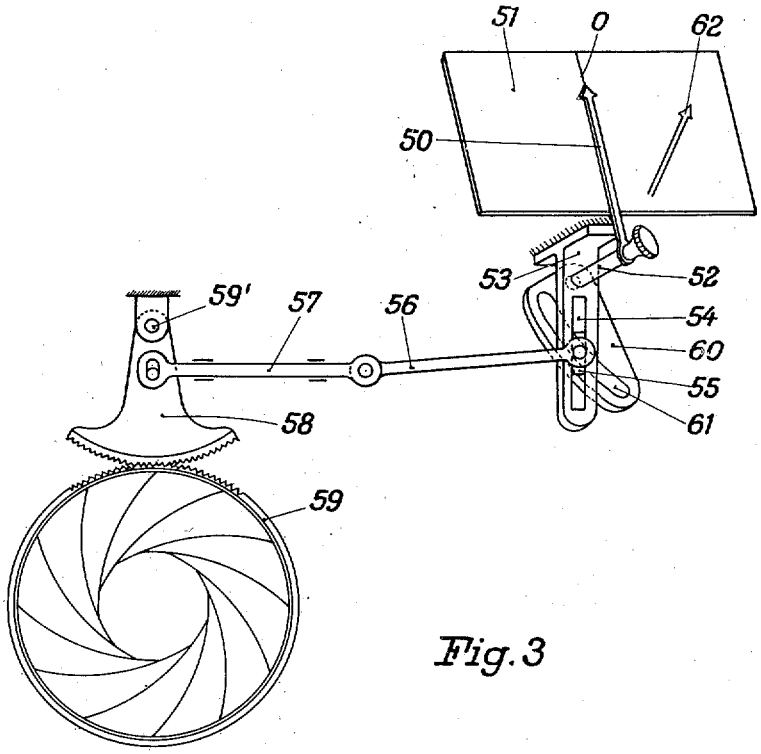
Fig. 3 shows a tooth gear mechanism for adjusting the diaphragm of the objective.

The fact that the intensity of illumination of the plate varies in proportion to the square of the diameter of the diaphragm can also be taken into account by inserting a suitable gear in the adjusting mechanism of the diaphragm. Such an arrangement is shown on Fig. 3. The indicator 50, movable above the finder glass 51 which latter carries a line representing the 0 mark, is fixed on the adjusting peg 52. The adjusting peg 52 is rotatably supported in the bracket 53. The bracket 53 is fixed solidly on the photographic camera and fitted with a slot serving as a straight line guide. Inside the slot 54 glides the sliding block 55 which is connected through rods 56 and 57 with the toothed segment 58. The toothed segment 58 is pivoted on the solidly fixed pin 59 and engages with the toothing on the diaphragm frame 59. The adjusting peg is connected with the link 60, in which a curved slot 61 is provided. The curvature of the slot has been chosen so as to ensure that when the adjusting pin 52 is turned, the segment 58 or respectively the diaphragm 59 will effect movements of such magnitude as to make the intensity of illumination of the photographic plate vary in proportion to the movements of indicator 50. In other respects the arrangement, notably the electrical adjusting mechanism for the indicator 62 and the arrangement of the photocell resembles that shown on Fig. 1.

Figure 5:
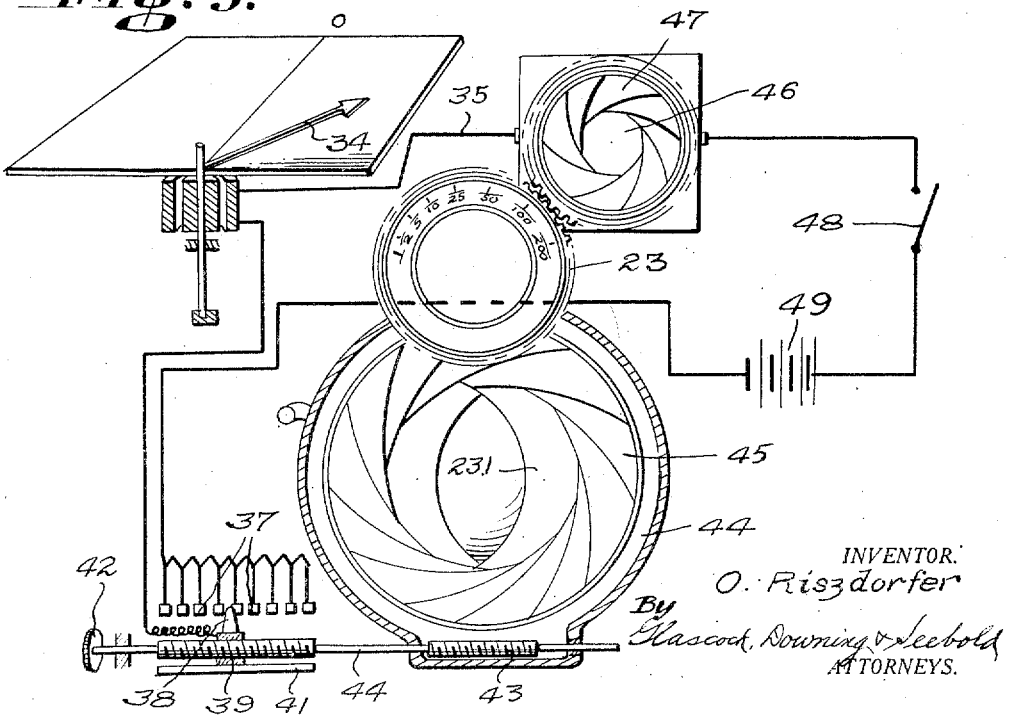
Fig. 5 shows an arrangement according to Fig. 2 but with the shutter adjusting means connected up to the diaphragm of the photo cell.

The constructional form shown in Fig. 5 corresponds substantially to the arrangement of Fig. 2 but the diaphragm 47 of the photocell 46 is positively connected up to the speed adjusting member 23 of a variable speed shutter by gear teeth, so that when the shutter speed is adjusted, the diaphragm of the photo cell is correspondingly adjusted. By this means, if the shutter speed is adjusted to a particular value, the correct diaphragm opening is obtained when the indicator 34 is brought into the zero position. On the other hand when it is desired to employ a particular stop number, after the diaphragm 45 has been suitably adjusted, it is only necessary to adjust the diaphragm 47 of the photo cell until the indicator 34 is brought into the zero position.

What I claim is:

1. In a portable photographic apparatus having an objective and two exposure controlling devices, viz., a shutter and a diaphragm for controlling the quantity of light passing through said objective, means for determining the correct exposure, comprising in combination a photo-electric cell having an adjustable diaphragm for varying the quantity of light passing to the cell, two indicating members, one of said members actuatable by the cell current, manually actuatable means for varying the position of one of said indicating members relatively to the other for enabling the indicating members to be brought into coincidence and positive transmission means connected to one of said exposure controlling devices so as to enable the said exposure controlling device to be adjusted in accordance with the displacement of the indicating member actuated by the cell current.

2. In a portable photographic apparatus having an objective and two exposure controlling devices, viz., a shutter and a diaphragm for controlling the quantity of light passing to said objective, means for determining the correct exposure, comprising in combination a photo-electric cell having an adjustable diaphragm for varying the quantity of light passing to the cell, a fixed indicating member, a movable indicating member actuatable by the cell current, manually actuatable means for varying the position of said movable indicating member relatively to the fixed indicating member for enabling the indicating members to be brought into coincidence and positive transmission means connected to said manually actuatable means and to one of the said exposure controlling devices, so as to enable the said exposure controlling device to be adjusted in accordance with the displacement of the indicating member actuated by the cell current.

3. In a portable photographic apparatus having an objective and two exposure controlling devices, viz., a shutter and a diaphragm for controlling the quantity of light passing to said objective, means for determining the correct exposure, comprising in combination a photo-electric cell having an adjustable diaphragm for varying the quantity of light passing to the cell, a movable indicating member having electrical actuating means therefor operatively connected to the photo-electric cell so as to be capable of operation by the cell current, a second indicating member, manually actuatable regulating means for varying the strength of the cell current, for varying the position of said movable indicating member relatively to the other indicating member and positive transmission means connected to said manually actuatable regulating means and to one of said exposure controlling devices, so as to enable the said exposure controlling device to be adjusted in accordance with the displacement of the indicating member actuated by the cell current.

4. In a portable photographic apparatus having an objective and two exposure controlling devices, viz., a shutter and a diaphragm for controlling the quantity of light passing to said objective, means for determining the correct exposure, comprising in combination a photo-electric cell having an adjustable diaphragm for varying the quantity of light passing to the cell, a movable indicating member having electrical actuating means therefor operatively connected to the photo-electric cell so as to be capable of operation by the cell current, a second indicating member, a manually actuatable variable resistance for varying the strength of the cell current, for varying the position of said movable indicating member relatively to the other indicating member and positive transmission means connected to said variable resistance and to one of said controlling devices, so as to enable the said exposure controlling device to be adjusted in accordance with the displacement of the indicating member having electrical actuating means therefor.

5. In a portable photographic apparatus having an objective and two exposure controlling devices, viz., a shutter and a diaphragm for controlling the quantity of light passing through said objective, means for determining the correct exposure, comprising in combination a photo-electric cell having an adjustable diaphragm for varying the quantity of light passing to the cell, said diaphragm operatively connected to one of said exposure controlling devices, two indicating members, one of said members actuatable by the cell current, manually actuatable means for varying the position of one of said indicating members relatively to the other for enabling the indicating members to be brought into coincidence and positive transmission means connected to said manually actuatable means and the other of the said exposure controlling devices so as to enable the said exposure controlling device to be adjusted in accordance with the displacement of the indicating member actuated by the cell current.

6. In a portable photographic apparatus having an objective and two exposure controlling devices, viz., a shutter and a diaphragm for controlling the quantity of light passing to said objective, means for determining the correct exposure, comprising in combination a photo-electric cell having an adjustable diaphragm for varying the quantity of light passing to the cell, said diaphragm operatively connected to one of said exposure controlling devices, a fixed indicating member, a movable indicating member actuatable by the cell current, manually actuatable means for varying the position of said movable indicating member relatively to the fixed indicating member for enabling the indicating members to be brought into coincidence and positive transmission means connected to said manually actuatable means and to the other of the said exposure controlling devices, so as to enable the said exposure controlling device to be adjusted in accordance with the displacement of the indicating member actuated by the cell current.

7. In a portable photographic apparatus having an objective and two exposure controlling devices, viz., a shutter and a diaphragm for controlling the quantity of light passing to said objective, means for determining the correct exposure, comprising in combination a photo-electric cell having an adjustable diaphragm for varying the quantity of light passing to the cell, said diaphragm operatively connected to one of said exposure controlling devices, a movable indicating member having electric actuating means therefor operatively connected to the photo-electric cell so as to be capable of operation by the cell current, a second indicating member, manually actuatable regulating means for varying the strength of the cell current, for varying the position of said movable indicating member relatively to the other indicating member, and positive transmission means connected to said manually actuatable regulating means and to the other of said exposure controlling devices, so as to enable the said exposure controlling device to be adjusted in accordance with the displacement of the indicating member actuated by the cell current.

8. In a portable photographic apparatus having an objective and two exposure controlling devices, viz., a shutter and a diaphragm for controlling the quantity of light passing to said objective, means for determining the correct exposure, comprising in combination a photo-electric cell having an adjustable diaphragm for varying the quantity of light passing to the cell, said diaphragm operatively connected to one of said exposure controlling devices, a movable indicating member having electrical actuating means therefor operatively connected to the photo-electric cell so as to be capable of operation by the cell current, a second indicating member, a manually actuatable variable resistance for varying the strength of the cell current, for varying the position of said movable indicating member relatively to the other indicating member and positive transmission means connected to said variable resistance and to the other of said controlling devices, so as to enable the said exposure controlling device to be adjusted in accordance with the displacement of the indicating member having electrical actuating means therefor.

9. In a portable photographic apparatus having an objective and two exposure controlling devices, viz., a shutter and a diaphragm for controlling the quantity of light passing through said objective, means for determining the correct exposure, comprising in combination a light-sensitive cell, indicating means fixed in position corresponding to the speed of the shutter, movable indicating means actuatable by the cell current, manually actuatable means for adjusting the amount of light falling on the cell to vary the position of the movable indicating means for enabling the fixed and movable indicating means to be brought into coincidence, and a mechanical coupling between said manually actuatable means and the diaphragm of the objective so as to enable said diaphragm to be adjusted in accordance with the displacement of the indicating means actuated by the cell current.

10. In a portable photographic apparatus having an objective and two exposure controlling devices, viz., a shutter and a diaphragm for controlling the quantity of light passing to said objective, means for determining the correct exposure comprising in combination a light-sensitive cell, movable indicating means having electrical actuating means therefor operatively connected to said cell so as to be capable of operation by the cell current, a second indicating means occupying a position corresponding to the setting of one of said exposure controlling devices, manually actuatable adjustable means for varying the quantity of light falling on the cell for varying the position of said movable indicating means relatively to the other indicating means and positive transmission means connected to said manually actuatable means and to the other of said exposure controlling devices so as to enable the said other exposure controlling device to be adjusted in accordance with the displacement of the indicating means having electrical actuating means therefor.

11. In a portable photographic apparatus, an objective, a shutter, and a diaphragm for controlling the quantity of light passing through the objective, means for determining the correct exposure, comprising in combination a light-sensitive cell, a first indicating means actuatable by the cell current, a second indicating means occupying a position corresponding to the speed of the shutter, manually actuatable means for varying the amount of light falling on the cell for enabling the first indicating means to be moved relatively to the second indicating means, and positive transmission means connecting the manually actuatable means to the diaphragm.

12. In a portable photographic apparatus having an objective and two exposure controlling devices, viz., a shutter and an adjustable diaphragm for controlling the quantity of light passing through the objective, means for adjusting the diaphragm to the proper setting for correct exposure including movable indicating means, a light-sensitive cell for energizing said movable indicating means, an adjustable diaphragm for controlling the quantity of light falling on the light-sensitive cell, a manually operated indicating means operatively connected to said shutter, manually actuatable means for simultaneously adjusting the objective diaphragm and the light-sensitive cell diaphragm whereby the position of the movable indicating means is varied in accordance with the position of the manually operated indicating means.

13. The combination of a photographic camera with a photoelectric exposure meter, including a lens system, means for adjusting the opening of said lens system, a shutter, means for adjusting the speed of said shutter, and means correlating both of said adjusting means with said photoelectric exposure meter, said correlating means being adapted to control the reading of said exposure meter when either of said adjusting means are actuated, the said correlating means upon setting of one of said adjusting means being adapted to control the final adjustment of the other adjusting means to set up a predetermined reading in the exposure meter by both of said adjustments.

14. In a photographic camera having an objective and two exposure controlling devices, viz., a shutter and a diaphragm for controlling the quantity of light passing through said objective, a light sensitive cell, indicating means connected to the cell and actuatable by the cell current, means for adjusting the opening of the diaphragm, means for adjusting the speed of the shutter, means connected to and adjustable with the diaphragm adjusting means for correspondingly varying the cell current, means connected to and adjustable with the shutter adjusting means for correspondingly varying the cell current, whereby the indicating means actuatable by the cell current is responsive jointly to adjustment of the diaphragm opening and of the shutter speed setting.

15. In a photographic camera in which a predetermined reading of a light sensitive device indicates that the camera is set for proper exposure, a shutter, means for adjusting the speed of the shutter, a diaphragm, means for adjusting the opening of the diaphragm, and a light sensitive device including a measuring instrument electrically connected to a light sensitive cell for giving a reading, the reading of said device being responsive jointly to both of said adjusting means, whereby the amount of adjustment of one of said means necessary to set up a predetermined reading of said device depends upon the adjustment of the other of said means.

ÖDÖN RISZDORFER.